Figure 1:
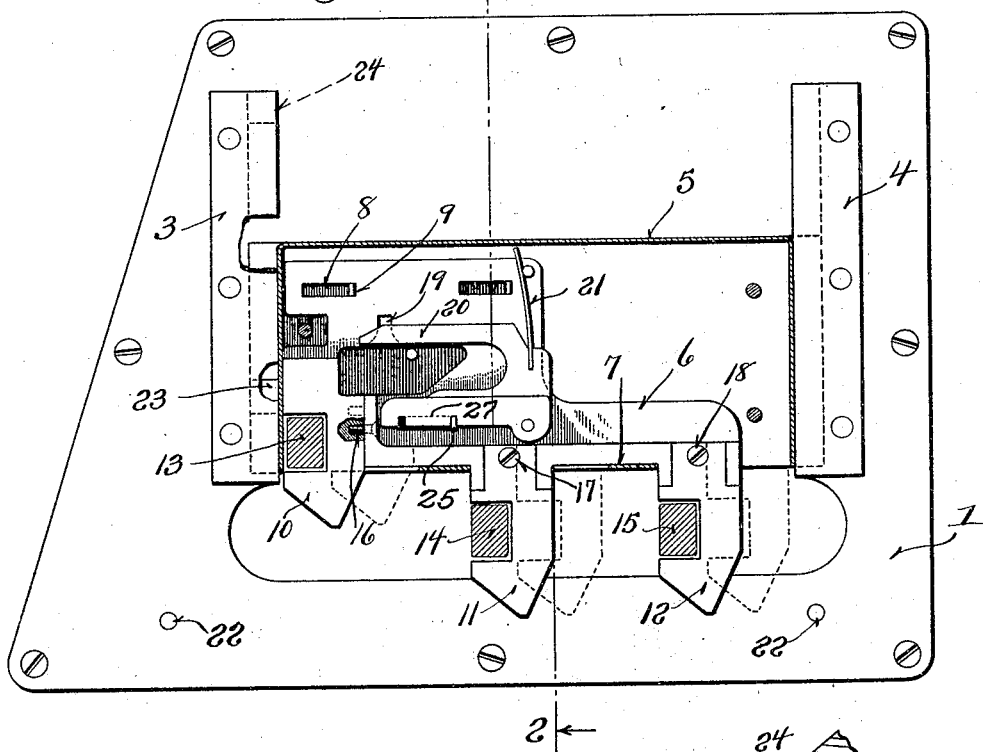

Aug. 21, 1923.  L. WEITZMAN  1,465,926
AUTOMOBILE LOCK
Filed Oct. 8, 1921

Inventor:
Louis Weitzman
By Young & Young
Attorneys

Witness:
Robert E. Weber

Patented Aug. 21, 1923.

1,465,926

UNITED STATES PATENT OFFICE.

LOUIS WEITZMAN, OF MILWAUKEE, WISCONSIN.

AUTOMOBILE LOCK.

Application filed October 8, 1921. Serial No. 506,357.

*To all whom it may concern:*

Be it known that I, LOUIS WEITZMAN, a citizen of the United States, and resident of Milwaukee, in the county of Milwaukee and State of Wisconsin, have invented certain new and useful Improvements in Automobile Locks; and I do hereby declare that the following is a full, clear, and exact description thereof.

My invention relates to a new and improved automobile lock such as may be used for locking an automobile to prevent its use by unauthorized persons.

The object of the invention is broadly to provide an improved means for locking the clutch lever in neutral position and if desired the same principle may be carried out for locking the other operating levers.

A more specific object of the invention is to provide a structure of this kind which is simple and inexpensive and may be attached to the automobile with the minimum amount of labor and expense.

In the accompanying drawing I have illustrated one form of my invention as it may be applied to an automobile of a well known type but it is to be understood that the principle of the invention may be used in connection with any automobile of standard make.

In the drawing:—

Figure 2:
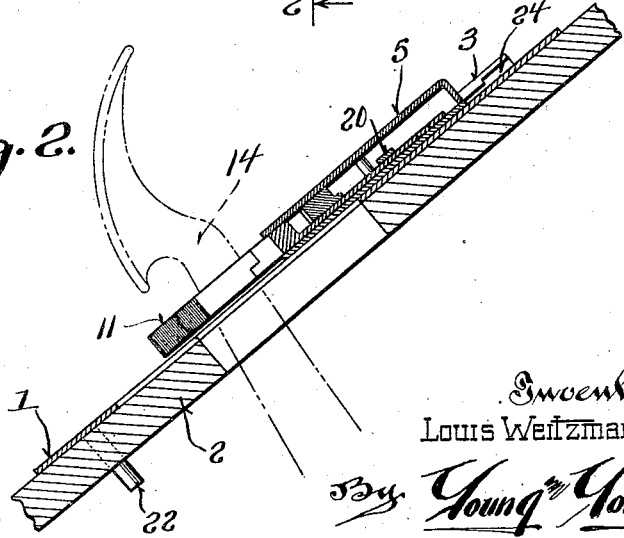

Figure 1 is a plan view of my invention with the front of the casing cut away in order to show the interior construction, and Figure 2 is a longitudinal sectional view on the line 2—2 of Figure 1.

In carrying out my invention I provide a plate 1 which is secured by suitable screws or the like to the floor board 2 of an automobile. Secured to the plate are guideways 3 and 4 in which a keeper 5 is longitudinally slidable. Within the keeper a shackle 6 is mounted for transverse movement being guided by the side 7 of the keeper and by the slots 8 which ride on the pins 9 which are secured to the plate. The shackle may be provided with one or more jaws which are adapted to engage one or more of the operating levers to lock the same against movement. In the embodiment of my invention which is shown in the drawing I have provided three jaws 10, 11, and 12, which are adapted to lock the clutch lever 13, the reverse lever 14, and the brake lever 15 respectively. These jaws may be adjustably mounted by means of screws 16, 17, and 18, or the like, so that the device may be adapted for application to different models wherein the levers may be located in different positions. The shackle is designed to be moved to locking or releasing position by means of a key and for the sake of illustration I have shown it in connection with a lock of conventional form wherein a notch 19 is provided for engagement by the key and a tumbler 20 which is yieldingly held by a spring 21 and may be operated by a key of the proper shape to release the shackle for transverse movement as the key is turned.

The tumbler 20 is, of course, raised by the key's striking the under side of its upper arm. Its lower arm is therefore raised from engagement with a projection 25 which extends from the back of the plate thru a slot 27 in the shackle. The tumbler may be provided with two slots, as shown, to lock the shackle in either of its extreme positions.

When the device is in locked position as shown in full lines, the levers are locked against movement and dowel pins 22 which are permanently secured to the plate 1 will prevent the removal of the lock even though the screws are removed. When it is desired to unlock the device the keeper 5 and the shackle carried thereby may be raised in the guideways 3 and 4 to a position comparatively remote from the operating pedals or levers. The device is held in this position by a bolt 23 which forms a continuation of the shackle and when the key is turned to the left engages with the recess 24 to hold the lock in this position.

From the above description it will be seen that I have provided a locking device of simple construction which may be put on the market at popular prices and which may be very easily installed, the only tool required for the installation being a screw driver. It will also be seen that by means of this device the operating levers will be positively held in inoperative position and the device cannot be readily removed by an unauthorized person since the dowel pins 22 in connection with the shackle will prevent its removal even though the screws are taken out.

I claim as my invention:—

1. In a device of the character described, a plate, means for securing the same to the floor board of an automobile, a shackle carried by said plate, and key actuated means for locking said shackle in position to prevent shifting of the operating levers of the automobile, such shackle having means co-operating with said key, whereby said shackle is shifted by said key into and out of locking position.

2. In a device of the character described, a plate adapted to be secured to the floor board of an automobile, a keeper longitudinally slidable in said plate, a shackle transversely slidable in said keeper to a position to lock or release the operating levers of an automobile, key actuated means for moving the shackle to either of said positions and for locking the same to said keeper, and means permanently secured to the plate to prevent its removal while the shackle is in locking position, said key actuated means also including means for locking the keeper and shackle in a relatively remote position from said levers so as to be out of the way when the automobile is being operated.

3. In a device of the character described, a plate adapted to be secured to the floor of an automobile, a shackle carried by said plate, a plurality of jaws carried by said shackle and adjustable with reference to said shackle, and adapted to engage the operating levers of an automobile, and key actuated means for locking said shackle to prevent shifting of said operating levers.

In testimony that I claim the foregoing I have hereunto set my hand at Milwaukee, in the county of Milwaukee and State of Wisconsin.

LOUIS WEITZMAN.